United States Patent [19]

Rogers

[11] 4,033,621
[45] July 5, 1977

[54] ORIGINAL CONFIGURATION RETENTION EXTENDIBLE ROOF SECTIONS BY MEANS OF UNIVERSAL INSERTS

[76] Inventor: Garry W. C. Rogers, 402 Kirkfield St., Winnipeg, Manitoba, Canada, R3K 1E6

[22] Filed: Nov. 17, 1975

[21] Appl. No.: 632,476

[52] U.S. Cl. .......................................... 296/137 B
[51] Int. Cl.² .......................................... B60J 7/18
[58] Field of Search .............. 296/137 B, 137 R, 26

[56] References Cited

UNITED STATES PATENTS

| 3,061,359 | 10/1962 | Pearlham | 296/137 B |
| 3,134,198 | 5/1964 | Calthorpe | 296/137 B |
| 3,190,689 | 6/1965 | Calthorpe | 296/137 B |
| 3,212,812 | 10/1965 | Kurtz | 296/137 B |
| 3,913,971 | 10/1975 | Green | 296/137 B |
| 3,955,848 | 5/1976 | Lutz | 296/137 B |

Primary Examiner—Robert R. Song

[57] ABSTRACT

If any portion of a rigid surface is to be extended above the plane of the rest of the surface, then the extendible portion must be pierced. If it is necessary to keep elements from entering the resulting cuts and openings necessary to accomplish such an extension, then a weatherproof seal must be provided especially for those cuts pierced in a direction perpendicular to weathering forces and parallel to natural drawings. Since roofs are of varying shapes, there is a need for universal plates to be inserted in above mentioned cuts. These plates will provide a weatherproof seal in either extended or conventional configuration.

3 Claims, 19 Drawing Figures

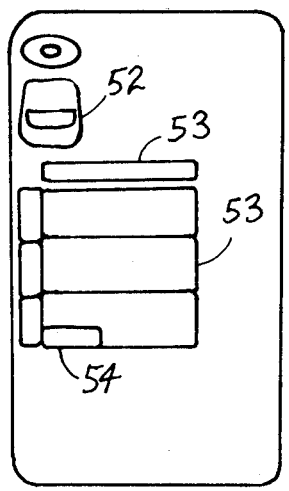
fig. 11. a.
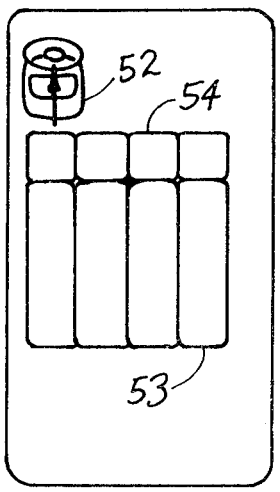
fig. 11. b.
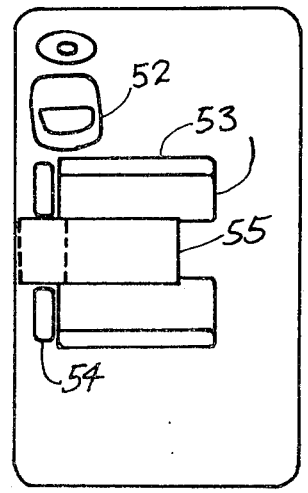
fig. 11. c.
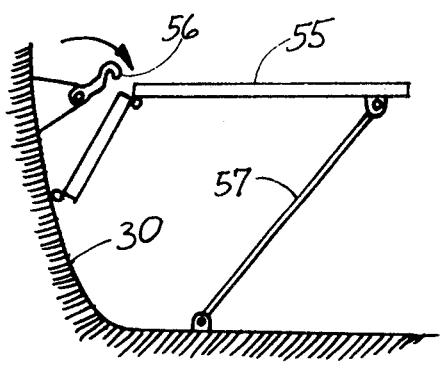
fig. 12. a.
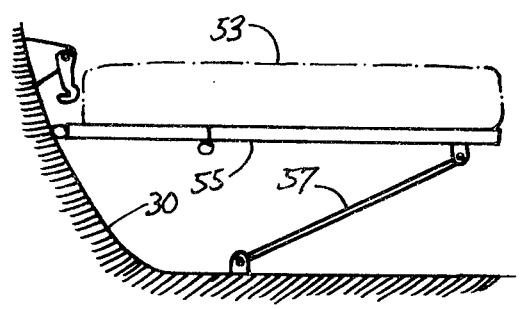
fig. 12. b.
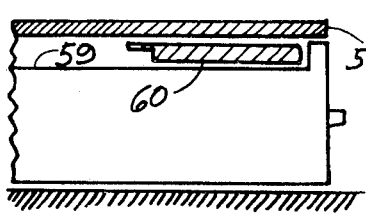
fig. 13. a.
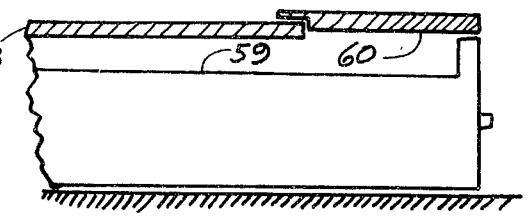
fig. 13. b.
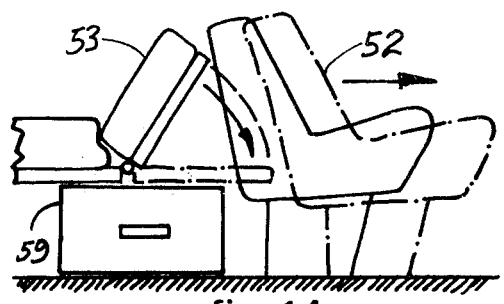
fig. 14.
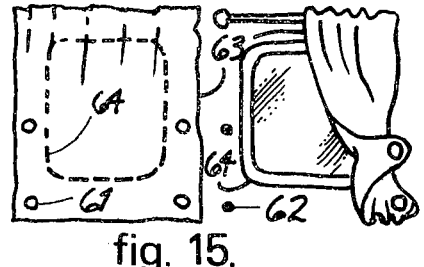
fig. 15.

ORIGINAL CONFIGURATION RETENTION EXTENDIBLE ROOF SECTIONS BY MEANS OF UNIVERSAL INSERTS

The basic concept of this invention is universal weatherproof plates of a shape that matches the original shape, general curvature of the roof or of a flattened shape and will allow either side or end of the section to be hinged or the whole section to be raised and which are to be inserted in or fastened on both edges of cuts in any shape roof, and designed in such a way as to seal but allow extension and, if need be, reseal of a member between the original plane and the extended portion.

Many attempts to provide headroom in a van have been made. (a) Tops that provide headroom by a fixed higher top still allow wracking since the roof has been removed. A higher fixed top creates a larger volume of air to be heated. The extra height of a fixed higher top increases fuel consumption, causes more wind sway and limits parking and servicing since many garage doors and parkades will not accommodate high vehicles. (b) Tops with flexible sides require posts or similar extra supports that take up badly needed space. The extra supports require extra maintenance and cost. Flexible materials either rot, rip or crack and a new roof section must be manufactured to accommodate flexible sides. (c) Rigid extendible tops that fit over the opening to waterproof, necessitate a new roof section be manufactured at additional cost, create a higher configuration in the conventional mode and require extra reinforcement to prevent wracking. The slope diminishes head room front, back and sides where it is needed. The thousands of dollars spent in designing the roof to match the van are wasted when the new section is mounted on top of the roof.

I have found that the disadvantages of permanent, flexible wall or fit-over rigid wall extendible tops can be overcome by the use of waterproof plates inserted into or attached to both edges of the cuts necessary to separate the extendible and fixed portions of a roof. Such plates permit: (a) the original material and structure to be used, with the exception of the metal removed to make said cuts, aesthetics to be retained and costs to be reduced; (b) any shape roof to be converted to an extendible configuration necessitating manufacture of only one set of plates; (c) the roof section to fit back down into the roof to restore rigidity and therefore reduce body twist; (d) a lower profile to conventional configuration which yields better gas mileage, less side area to reduce sway due to side winds, a smaller volume to be heated and access to more parking and servicing facilities; (e) the use of rigid self-supporting walls which leaves the cargo area unrestricted and only a small portion of the ceiling reduced by 1 ½ to 2 inches for compact top storage; (f) the use of interlocking rigid panels to burglarproof the whole top in either configuration plus a secondary built-in interior locking feature; (g) no rotting, folding, snags or cracking of flexible materials; (h) almost all folding down to be done in the rain since every operation can be performed inside except the time it takes for two objects to fall 30 inches; (i) sufficient rigidity so that no extra supports are necessary, therefore all camping accessories can still be installed such as roof vent, air conditioner, insulation, wiring, lights, canopy and windows; (j) bunk bed supports and roof top carriers to be built right into the end plate design; (k) the simplest principle—gravity, and the simplest machine—levers, to operate the top which causes this method to be most efficient when combined with the simplest weatherproofing principle—overlap; (l) the use of a side hinge to be used in conjunction with the plates, the hinge producing a force opposing air pressure due to forward movement; (m) the original parts of the roof to be used which retain the original design; (n) the extendible portion to be hinged from any side or raised straight up, depending on the portion requiring headroom.

BRIEF DESCRIPTION OF THE DRAWINGS

FIG. 11 is a top view of cushion arrangements (a) a couch, (b) a bed and (c) a booth.

FIG. 12 is a side view of the table (a) raised and set back (b) lowered and extended.

FIG. 13 is a side view of the drawer (a) closed, (b) open.

FIG. 14 is a side view of the cushion vertical when driver's seat is back and horizontal with driver's seat forward.

FIG. 15 is a frontal view of the curtains buttoned (a) closed and (b) open.

In the drawings, like characters of reference indicate corresponding parts in the different figures.

DETAILED DESCRIPTION

It is much more practical to install a side hinge on a van since the side doors eliminate the possibility of installing any permanent fixtures along the side with cargo doors. Tables and beds must, therefore, be installed along the wall opposite the doors. The door side becomes the most favourable location to provide full headroom. The long hinge along the side (a) keeps more of the roof connected directly to the van, (b) creates a scissor action back to the original configuration to permit smaller tolerances and (c) allows smaller tolerances to be used, again reducing body twist. When a side hinge is used, a totally different front and back weather seal is necessary requiring that the front and rear edge of the extendible portion of the roof of any van be weatherproofed against driving forces and poor drainage which can be accomplished with the use of special "end plates".

Figure 1:
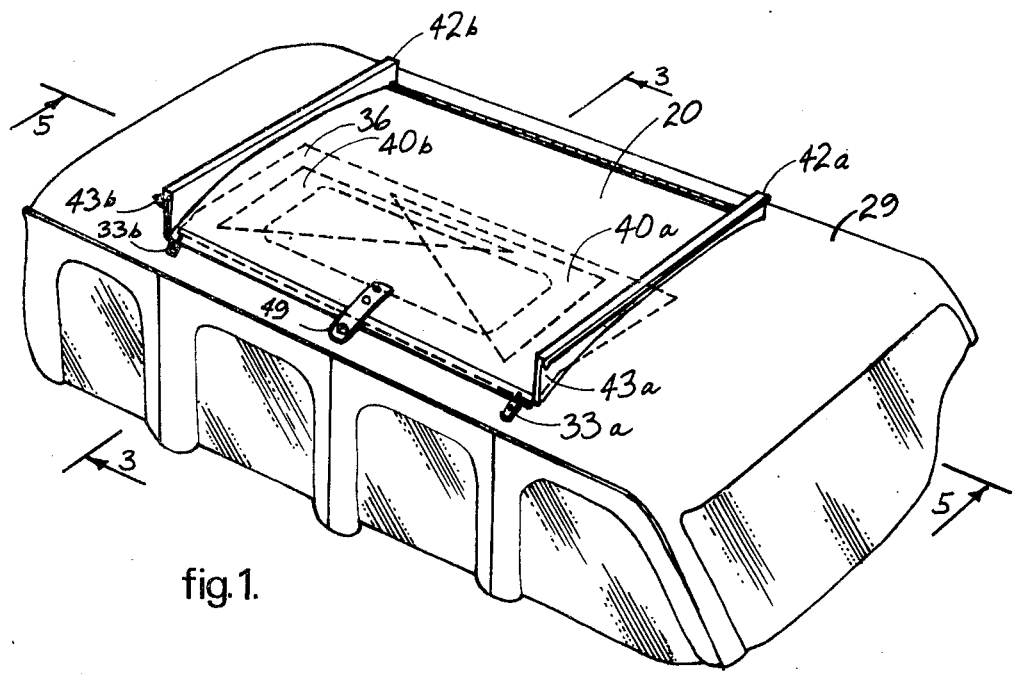
FIG. 1 is a view of the van with the top in the conventional configuration section in part to show the triangular end plates, window and square side plate used as a compartment.
Figure 2:
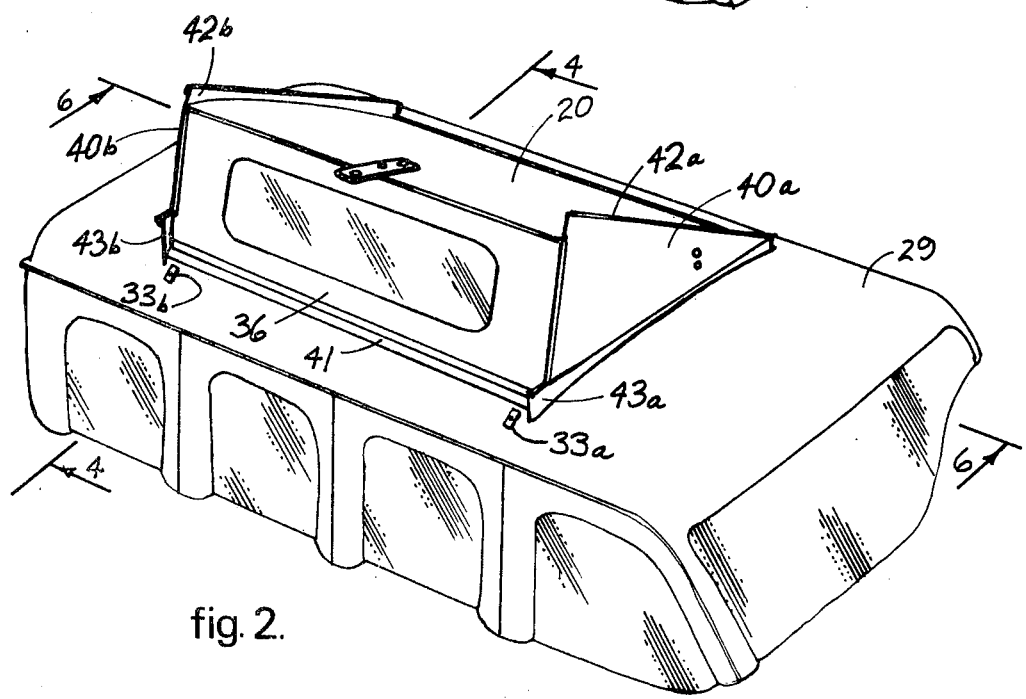
FIG. 2 is a view of the van top with roof section extended.

Proceeding, therefore, to describe the invention in detail, reference character 20 illustrates the moveable portion of the roof in the conventional configuration in FIG. 1. The hinged edge is weatherproofed by means of a piece of flexible material 22 beneath the full length and width of the hinge 21 as clearly illustrated in FIG.

3. The side opposite the hinge is waterproofed by means of an overlap 26 and soft weatherstrip 27.

Figure 5:
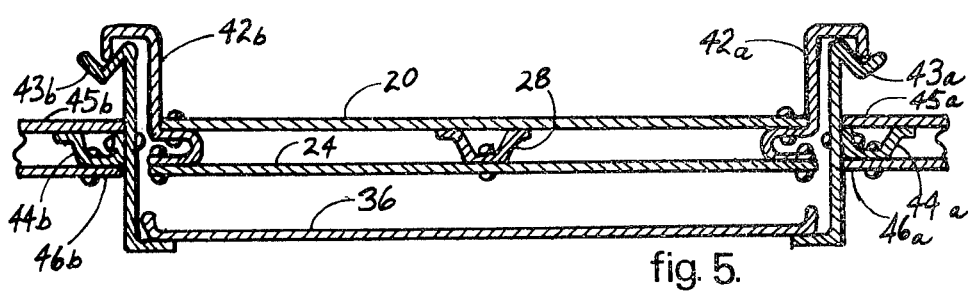
FIG. 5 is a section through line 5 of FIG. 1.

The slots cut in either end have weatherproof end plates 42 and 43 inserted in them as in FIG. 5. The inside end plates 42 are fastened to the edges of the extendible section 20 and end plates 43 are fastened to the edges of the fixed roof section 29 in a weatherproof manner. These end plates 42 and 43 fit each other as shown in FIG. 5 to weatherproof the cut. The upper portion of the end pieces are sufficiently strong to act as car top carriers. An extra bend in the lower end of the end plates 42a and 42b provide support to allow the ceiling 24 to be replaced as in FIG. 5. The end plates 42 and 43 can be installed and sealed by means of pop rivets and a silicone type sealant. If cuts are made at beams 44 as shown in FIG. 5, then a bead of sealant can be run along the edge of the beam 44 facing the end plate 43 and the end plate 43 fastened by rivets. If the lower portion of the end plates 42 are sliced to allow bending as shown in FIG. 5, then the end plate 42 can be riveted to the extendible portion of the roof 20. The sealant can be sandwiched between the end plate 42 and roof 20. If necessary an extra bead of sealant can be run along the inside or outside of each joint. By continuing the bend in the bottom portion of end plate 42 a support for the ceiling 24 can be provided. Remaining beams 28 will help support the ceiling. The space between the roof 20 or 45 and the ceiling 24 or 46 can hold insulation.

Figure 3:
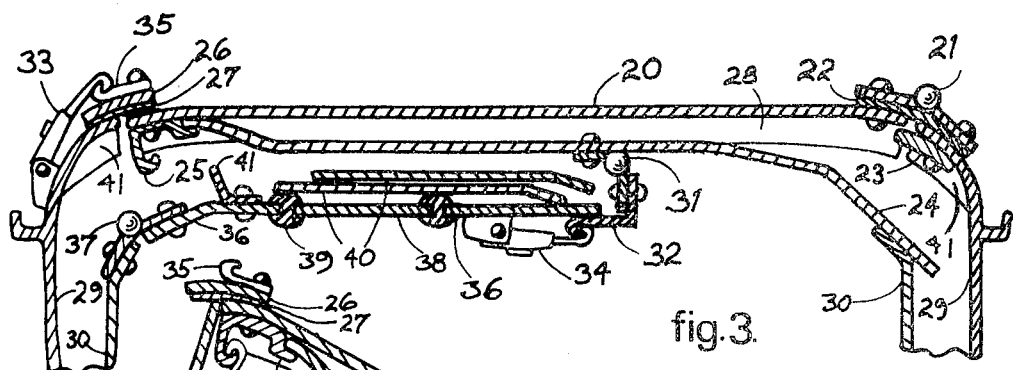
FIG. 3 is a section through the line 3 of FIG. 1.

The end filler plates 40a and 40b are stored beneath the ceiling 24 and resting on side filler plate 36 as in FIG. 3. The side filler plate 36 is supported on one side by a hinge 37 attached to the inner wall 30 and at the opposite side by a retainer 32 attached by means of latch 34 and a hinge 31 to the ceiling 24 in FIG. 3. The ends of the side filler plate 36 are supported by a right angle extension of the lower portion of end plate 43 as shown in FIG. 5.

Figures 7, 8:
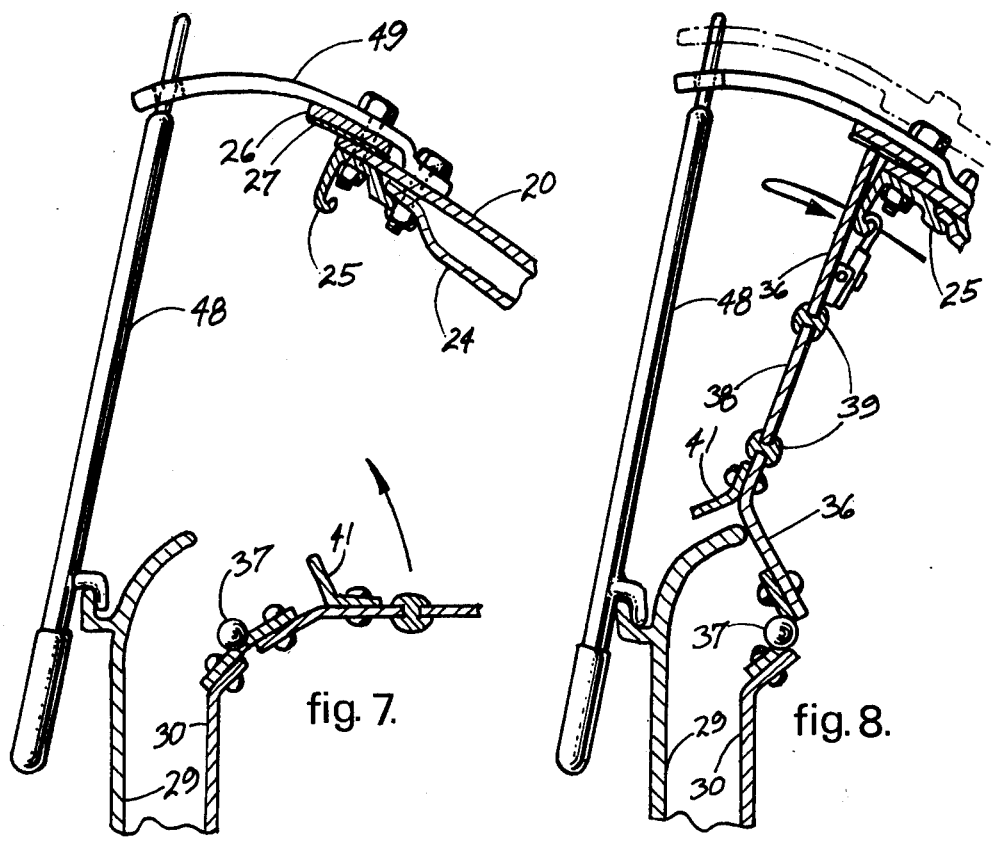
FIG. 7 is an enlarged, partially sectioned, fragmentary view of FIG. 4.
FIG. 8 is an enlarged, partially sectioned, fragmentary view of FIG. 4.

When latch 33 is fastened as in FIG. 3, the top can not be raised. If latch 33 inadvertently becomes unfastened, then the latch 34 and retainer 32 will prevent the top from raising since they are fastened to the inner wall 30 via the side filler plate 36. To raise the roof, the latches 33 and 34 must be released and the retainer 32 hinged away. The projection 49 on the edge of the extendible portion of the roof 20 as shown in FIG. 1 is used to raise said portion 20. FIG. 7 shows an extension of the uppermost end of the lifter 48 inserted in a hole in the projection 49 supporting the extendible portion 20. A hook in the lower end of the lifter 48 is retained by the gutter in the outer wall 29. FIG. 8 shows the roof 20 raised slightly, from inside the van, to allow the side filler plate 36 past the angle iron 25 and let back down to support and weatherproof the opening. A flexible member projecting downward from the lower portion of the angle 25 can be added to prevent the side filler plate from falling back during the above mentioned operation. Weatherproofing is accomplished at the top by the weight of the roof pressing the seal 27 against the side filler plate 36 and at the bottom by the overlap 41. When latches 34 are locked into the lower portion of the angle 25 (latch keeper), then the top can not be raised inadvertently. Note that the angle 25 provides reinforcement for the roof, a guide for the side filler plate, a keeper for the latch 34 and a flange to support the ceiling 24.

Figure 6:
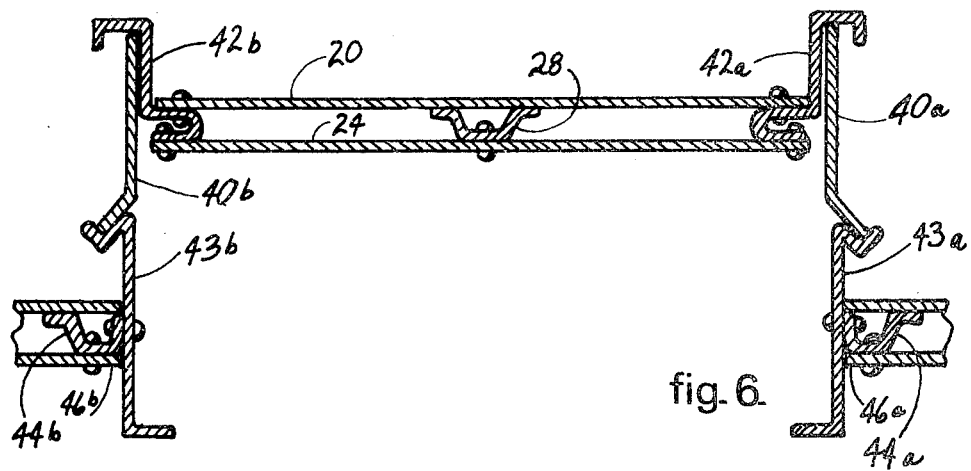
FIG. 6 is a section through line 6 of FIG. 2.
Figure 9:
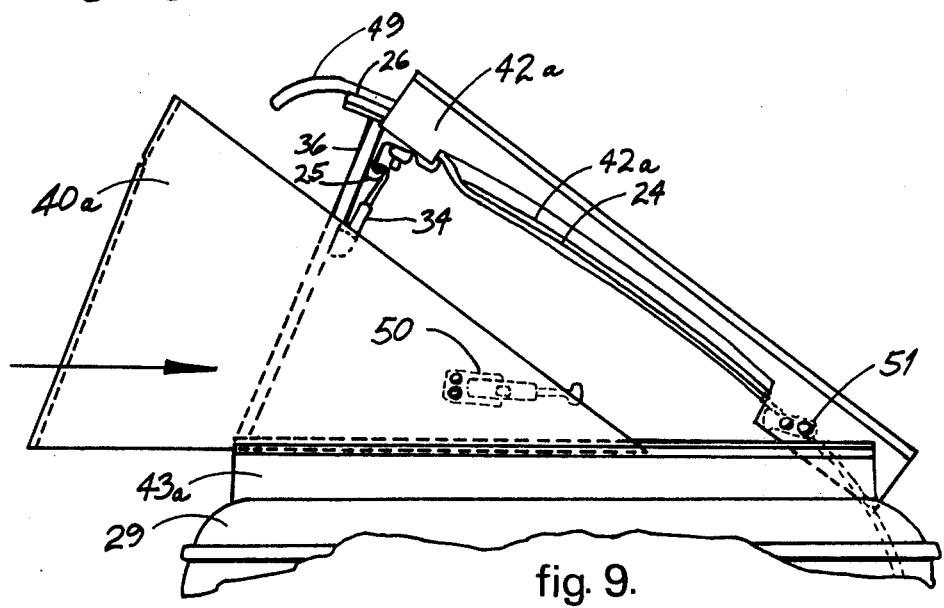
FIG. 9 is a section through line 4 of FIG. 2.
Figure 10:
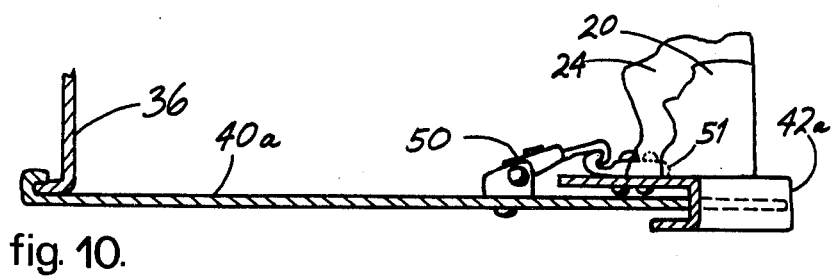
FIG. 10 is a top partially sectioned, fragmentary view of FIG. 9.

End filler plates 40a and 40b are slipped into position as shown in FIG. 9 to act not only as weatherproofing, but also further support for the roof section 20. Latch 50 pulls in and locks the end filler plate 40 in position. FIG. 6 shows weatherproofing and locking of upper edge accomplished by overlap of end plate 42 and weatherproofing and locking of upper edge of end filler plate 40 by resting in 43b. The remaining edge of the triangular end filler plate 40a is weatherproofed and locked as shown in the top plan view of the end filler plate 40 in FIG. 10. Note that all parts are interlocking and latched from the inside with extra latches 33a and 33b on the outside for extra protection and to prevent rattling. The roof and side filler plates can be raised mechanically or hydraulically. Rollers or slides can be used to raise the side filler plate and roof simultaneously. End filler plates can be hinged from each end of the side filler plate so all components are connected. A length of rod can double as a hinge if clamped at the centre of its length to the roof and the ends compression clamped.

Figure 4:
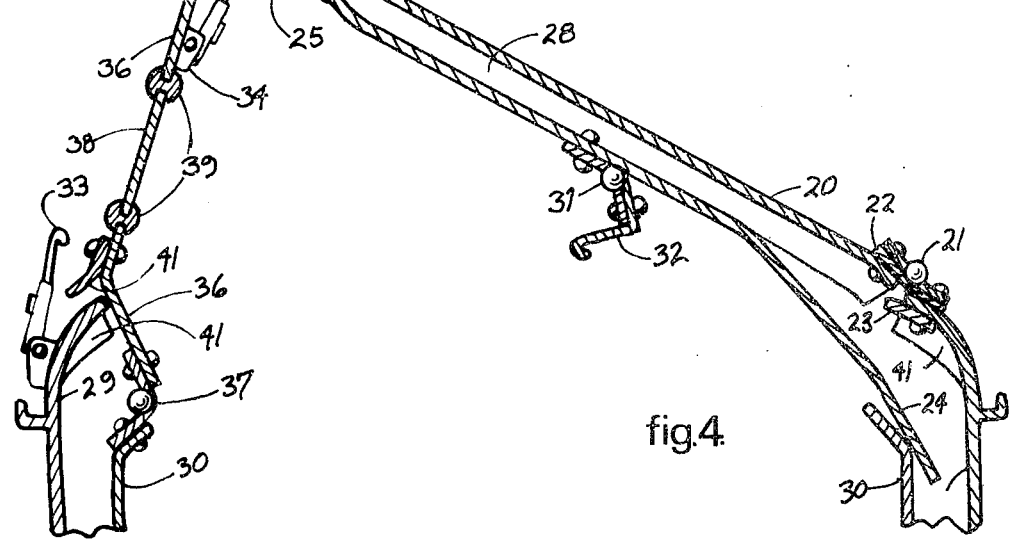
FIG. 4 is a section through the line 4 of FIG. 2.

FIG. 13a shows the table 55 retracted to allow more floor space FIG. 11c. Drawer 59 under the seats on each side of 55, FIG. 11c are closed as in FIG. 13a to provide more floor space. When the table 55 is down, FIG. 12b it extends to provide a wider bed space, FIG. 11b when used in conjunction with the extended drawer 59 as in FIG. 13b. The cushions rearranged as in FIG. 11a form a couch to be used by adults or padded play area for children that can be used when travelling. When the driver's seat 52 is moved ahead as shown in FIG. 4, the uppermost cushion 53 in FIG. 11a falls down to provide extra length to the bed.

The upper two of four fasteners 61 on each curtain 63 hold the curtains against the centre of the window, FIG. 15. By grasping the bottom corner of the curtain 63 and wrapping it around the rest of the curtain, it can be held to one side by refastening to the dome on the side of the window.

Various modifications may be constructed or performed within the scope of the invention concept disclosed. Therefore, what has been set forth is intended to illustrate such concept and is not for the purpose of limiting protection to any herein, particularly described thereof.

Other ways the universal plates can be put into operation or used are:

a. Transparent materials can be incorporated into any part or rigid transparent materials such as plexiglas or plastic can be used to replace opaque members.

b. Any roof where it is necessary to provide a temporary extended configuration such as grader, sweeper, tractor, plow or dozer where the equipment operator might be required to see past, over or around parts of the machine he is operating, can use this invention to achieve the necessary extension.

c. Display counters that would allow a better view of merchandise but be weather or burglar proof in either configuration.

d. A roof for mounting equipment that must be protected but projected past the original plane of the roof such as an observatory for a telescope.

e. Camper trailers can also be extended using the principles of the end plates.

What I claim is:

1. In a vehicle roof structure having therein a generally rectangular opening defining a first, second, third and fourth edge, a reliable top of a shape conforming to that of the roof opening, a first edge of said raisable top being hingedly connected to said first edge of said opening, means for locking said raisable top in a closed position; a weatherproof seal comprising a pair of generally vertically disposed plates, each of said plates being fastened to said third and fourth edge in a weather proof fashion, said plates extending beyond the uppermost portion and the lowermost portion of the roof structure, each of said plates having an upwardly opening channel means formed along the upper portion thereof, a pair of generally rectangular members each fastened to a third and fourth edge of said raisable top, a bend formed in the upper portion of each of said members, said bend having a portion extending outwardly and downwardly defining a downwardly opening channel adapted to engage over the upper portion of corresponding one of said plates when said raisable top is in said closed position, a pair of generally triangular rigid filler members, each received between corresponding ones of said upwardly opening channels and said downwardly opening channels when said raisable top is in said raised position to seal off undesirable elements, a side filler member of a generally rectangular shape which lower edge is hingedly connected to said second edge of said opening, the upper edge of said side filler member being adapted to supportively engage a second edge of said raisable top when said raisable top is in said raised position to seal off undesirable elements, and each of two side edges of said side filler member engaging corresponding one of remaining edges of said triangular filler members in a weatherproof fashion when said raisable top is in said raised position.

2. The roof structure of claim 1, wherein said side filler member forms a storage compartment in said closed position.

3. The roof structure of claim 1, wherein said side filler member can be fastened to said raisable top in its closed position as a secondary lock.

* * * * *